(12) United States Patent
Kim et al.

(10) Patent No.: US 8,749,811 B2
(45) Date of Patent: Jun. 10, 2014

(54) METHOD AND APPARATUS TO PRINT E-MAIL ACCORDING TO PRINTING ENVIRONMENT SETTINGS CORRESPONDING TO EACH USER

(75) Inventors: Hong-seock Kim, Seoul (KR); Yong-won Kwon, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1254 days.

(21) Appl. No.: 12/141,236

(22) Filed: Jun. 18, 2008

(65) Prior Publication Data

US 2009/0027700 A1    Jan. 29, 2009

(30) Foreign Application Priority Data

Jul. 24, 2007 (KR) .................. 10-2007-0074199

(51) Int. Cl.
*G06F 3/12* (2006.01)

(52) U.S. Cl.
USPC ........................... 358/1.15; 358/1.16

(58) Field of Classification Search
CPC ... G06F 3/1293; G06F 3/1231; G06F 9/4451; H04N 21/4532
USPC ............................ 358/1.15; 709/201; 707/610
See application file for complete search history.

(56) References Cited

U.S. PATENT DOCUMENTS

| 7,953,807 | B2 | 5/2011 | Shono |
| 2003/0084049 | A1* | 5/2003 | Wiley .............................. 707/10 |
| 2004/0015554 | A1* | 1/2004 | Wilson .......................... 709/206 |
| 2004/0056889 | A1* | 3/2004 | Katano ........................ 345/741 |
| 2004/0137919 | A1* | 7/2004 | Biundo ......................... 455/466 |
| 2005/0168776 | A1* | 8/2005 | Yamaguchi ................... 358/1.15 |
| 2008/0034068 | A1* | 2/2008 | Vaughan et al. .............. 709/220 |

FOREIGN PATENT DOCUMENTS

| JP | 2003-141041 | 5/2003 |
| JP | 2004-342023 | 12/2004 |
| KR | 1020020003584 | 1/2002 |
| KR | 1020050076310 | 7/2005 |

OTHER PUBLICATIONS

Office Action issued in Korean Patent Application No. 10-2007-0074199 on Sep. 28, 2011.

* cited by examiner

*Primary Examiner* — King Poon
*Assistant Examiner* — Kent Yip
(74) *Attorney, Agent, or Firm* — Stanzione & Kim, LLP

(57) ABSTRACT

A method and apparatus to print an e-mail according to printing environment settings corresponding to each user includes receiving a user profile stored in the outside, setting an e-mail printing environment by using the received user profile, and printing an e-mail received from an e-mail server according to the set e-mail printing environment. By doing so, users can print an e-mail according to a printing environment desired by a user in an image forming apparatus such as a Multi Function Printer (MFP), a printer, or the like which supports printing of an e-mail.

20 Claims, 10 Drawing Sheets

MFP
(110)

E-MAIL SERVER
(120)

METHOD AND APPARATUS TO PRINT E-MAIL ACCORDING TO PRINTING ENVIRONMENT SETTINGS CORRESPONDING TO EACH USER

CROSS-REFERENCE TO RELATED APPLICATIONS

This application claims priority under 35 U.S.C. §119(a) from Korean Patent Application No. 10-2007-0074199, filed on Jul. 24, 2007, in the Korean Intellectual Property Office, the disclosure of which is incorporated herein in its entirety by reference.

BACKGROUND OF THE INVENTION

1. Field of the Invention

The present general inventive concept relates to a method of printing an e-mail, and more particularly, to a method and apparatus to print an e-mail according to printing environment settings corresponding to each user, which are set by using a web service.

2. Description of the Related Art

FIG. 1 is a diagram illustrating a configuration of a conventional e-mail printing system.

Referring to FIG. 1, the conventional e-mail printing system is constituted of a Multi Function Printer (MFP) 110 and an e-mail server 120.

The MFP 110 supports Post Office Protocol 3 (POP3) or Internet Message Access Protocol (IMAP) and provides an e-mail printing function. The MFP 110 connects to the e-mail server 120, downloads an e-mail stored in the e-mail server 120, and then prints the downloaded e-mail.

The e-mail server 120 is an e-mail server supporting POP3 or IMAP. The e-mail server 120 temporarily stores an e-mail transmitted from the outside, and when a request for transmission is received from the MFP 110, the e-mail server 120 provides the MFP 110 with the stored e-mail.

However, since the conventional e-mail printing system provides all users with a same printing environment, an e-mail printing environment desired by an individual user cannot be provided. This causes undesired e-mails to be printed, thereby depleting resources. Also, whenever an individual user attempts to print an e-mail in a specific printing environment, the individual user has to input a desired e-mail printing environment to an image forming apparatus such as an MFP, a printer, or the like, which is inconvenient.

SUMMARY OF THE INVENTION

The present general inventive concept provides a method and apparatus to print an e-mail according to printing environment settings corresponding to each user, wherein the method and apparatus enable an e-mail printing environment to be set by using a web service whereby users can print an e-mail according to a respective user desired printing environment in an image forming apparatus such as a Multi Function Printer (MFP), a printer, or the like which are capable of using the web-service.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method of printing an e-mail according to printing environment settings corresponding to each user, the method including receiving a user profile stored externally, setting an e-mail printing environment by using the received user profile and printing an e-mail received from an e-mail server according to the set e-mail printing environment.

The foregoing and/or other aspects and utilities of the general inventive concept may also be achieved by providing a computer-readable recording medium having recorded thereon a program to execute a method, the method includes receiving a user profile stored externally, setting an e-mail printing environment by using the received user profile, and printing an e-mail received from an e-mail server according to the set e-mail printing environment.

The foregoing and/or other aspects and utilities of the general inventive concept may also be achieved by providing an apparatus to print an e-mail according to printing environment settings corresponding to each user, the apparatus including an interface unit to receive a user profile stored externally, a printing environment setting unit to set an e-mail printing environment by using the received user profile and an e-mail printing unit to print an e-mail received from an e-mail server according to the set e-mail printing environment.

The foregoing and/or other aspects and utilities of the general inventive concept may also be achieved by providing an email printing apparatus including a printing environment setting unit to set a respective user desired printing environment corresponding to a user by using a web service and an e-mail printing unit to print an e-mail based on the set user desired printing environment.

The user desired printing environment may include one or more of information on a private e-mail account of the user, filtering information indicating which e-mail is allowed to be printed or prohibited from being printed, and information indicating which method is to be used in printing an e-mail.

The user desired printing environment may correspond to a user profile.

The foregoing and/or other aspects and utilities of the general inventive concept may also be achieved by providing a method of printing an e-mail, the method including setting a respective user desired printing environment corresponding to a user by using a web service and printing the e-mail based on the set user desired printing environment.

The foregoing and/or other aspects and utilities of the general inventive concept may also be achieved by providing an e-mail printing system including a service broker to register a user profile correspond to a user, and a multifunctional printer (MFP) to check whether location information of the user profile is registered with the service broker, to connect to one of an e-mail profile server and a user PC corresponding to the location information based on the location information of the registered user profile, to perform authentication on the one of the e-mail profile server and the user PC, to receive a user profile stored in the one of the e-mail profile server and the user PC, to interpret the user profile, and to set an e-mail printing environment corresponding to a respective user.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
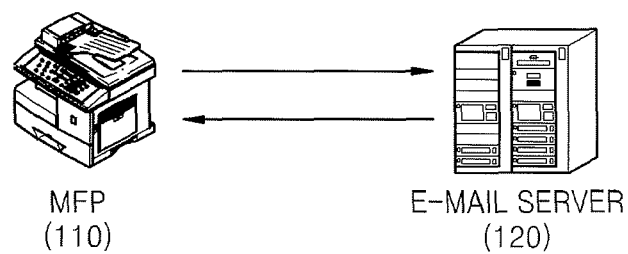
FIG. 1 is a diagram illustrating a configuration of a conventional e-mail printing system.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
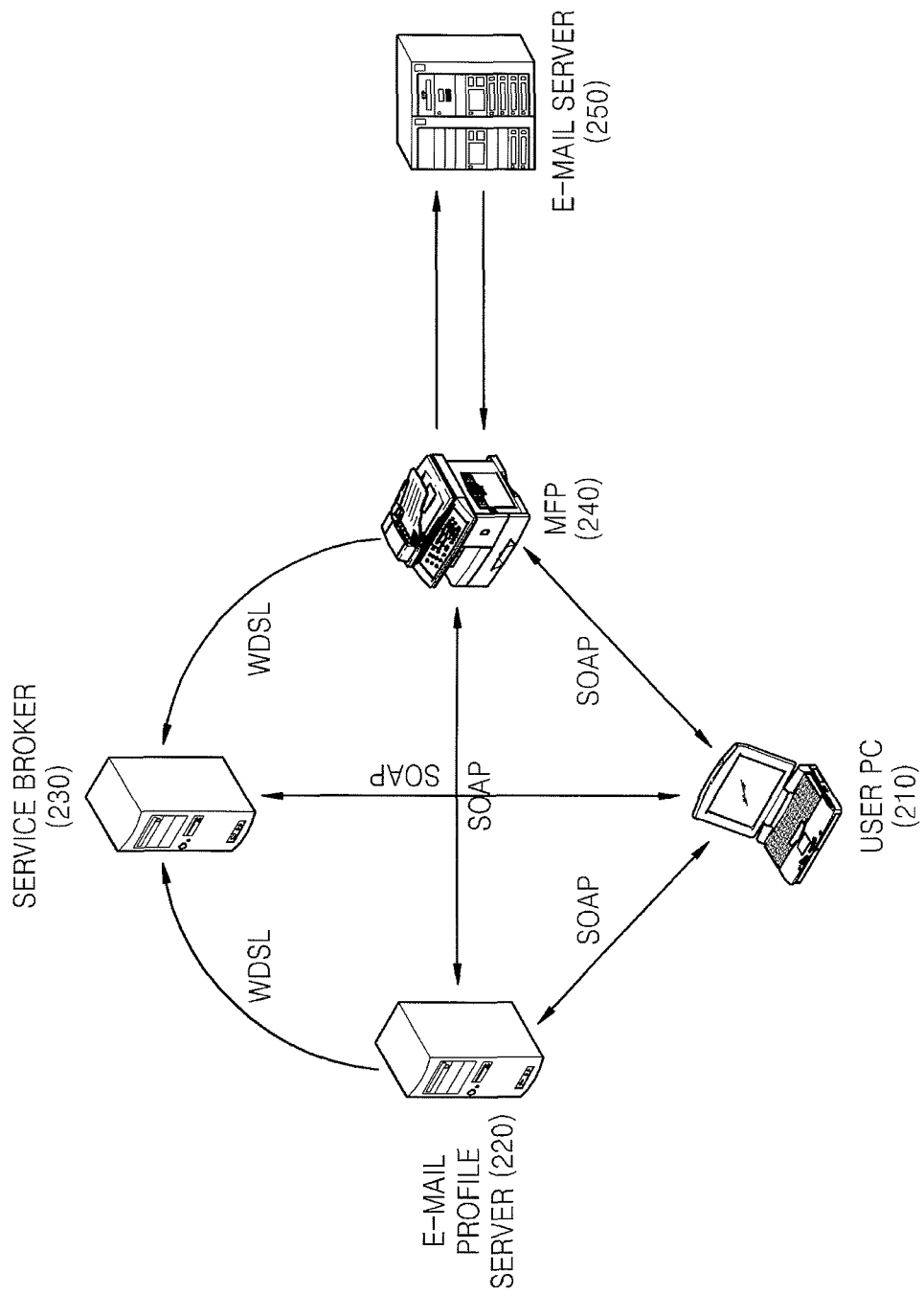
FIG. 2 is a diagram illustrating an e-mail printing system using a web service, according to an embodiment of the present general inventive concept.

FIG. 2 is a diagram illustrating an e-mail printing system using a web service, according to an embodiment of the present general inventive concept.

Referring to FIG. 2, the e-mail printing system according to the current embodiment includes a user Personal Computer (PC) 210, an e-mail profile server 220, a service broker 230, a Multi Function Printer (MFP) 240, and an e-mail server 250.

A user inputs a user profile to the user PC 210, and the user profile is stored in the e-mail profile server 220 or an internal memory device of the user PC 210. In the case where the user profile is stored in the e-mail profile server 220, the e-mail profile server 220 may be a service provider. In the case where the user profile is stored in the internal memory device of the user PC 210, the user PC 210 may be a service provider. In particular, in the case where the user profile is stored in the e-mail profile server 220, the user PC 210 is provided with information on the e-mail profile server 220 registered in the service broker 230, connects to the e-mail profile server 220 by using the provided information, and provides the connected e-mail profile server 220 with the user profile. The user PC 210 may be a desktop or laptop computer, The user PC 210 may also be a storage medium capable of connecting to a network.

Also, the user PC 210 scans MFPs registered in the service broker 230, determines from among the scanned MFPs the MFP 240 that is to use the user profile, and requests the determined MFP 240 to perform user authentication, thereby enabling the user profile to be applied to the desired MFP 240 so that the desired MFP 240 sets an e-mail printing environment.

The e-mail profile server 220 stores the user profile provided by the user PC 210, and registers a Uniform Resource Locator (URL) of the e-mail profile server 220 in the service broker 230, wherein the URL is location information of the user profile. Also, when the e-mail profile server 220 receives a request for provision of the user profile from the MFP 240, the e-mail profile server 220 provides the MFP 240 with the requested user profile.

The service broker 230 registers location information of the user profile. When the service broker 230 receives a request for the location information of the user profile from the MFP 240, the service broker 230 provides the MFP 240 with the location information of the requested user profile. Here, the location of the user profile may be information indicating that the user profile is stored in the e-mail profile server 220 or in the user PC 210.

The MFP 240 requests the service broker 230 for the location information of the user profile, and is provided with the location information of the user profile from the service broker 230. Also, the MFP 240 connects to the e-mail profile server 220 or the user PC 210 according to the provided location information of the user profile, thereby being provided with the user profile, and according to the provided user profile, sets the e-mail printing environment. Also, the MFP 240 receives an e-mail stored in the e-mail server 250, and prints the received e-mail according to the set e-mail printing environment. Such MFP 240 is an example of an apparatus supporting an e-mail printing function, and image forming apparatuses performing one or more functions from among a print function, a copy function, a scan function, and a fax message exchange function may substitute for the MFP 240.

The e-mail server 250 stores an e-mail transmitted from an external location, and when the e-mail server 250 receives a request for transmission of the e-mail from the MFP 240, the e-mail server 250 transmits the e-mail to the MFP 240.

Figure 3:
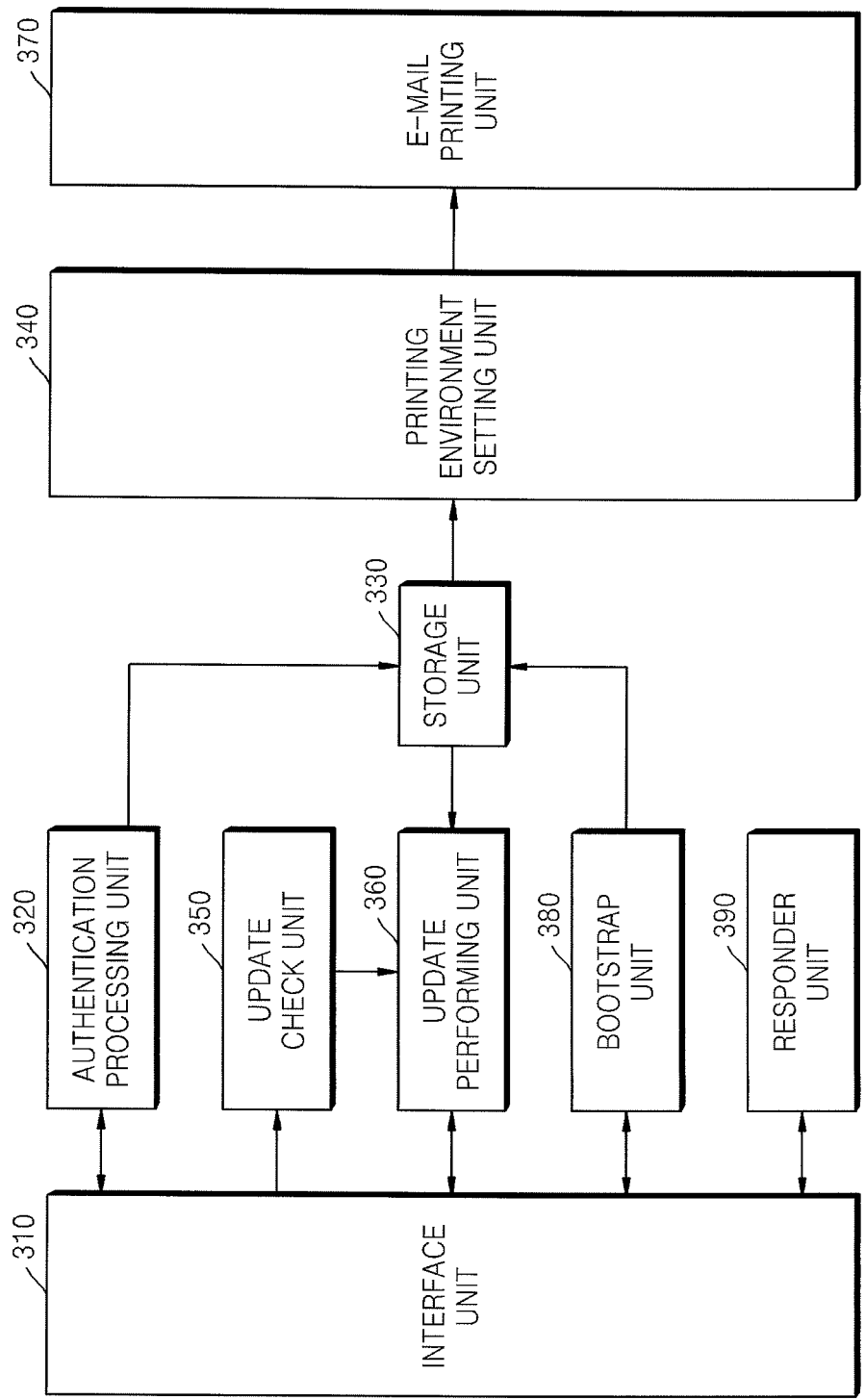
FIG. 3 is a block diagram illustrating a configuration of a MFP illustrated in FIG. 2.

FIG. 3 is a block diagram illustrating configuration of a MFP 240 illustrated in FIG. 2.

As illustrated in FIG. 3, the MFP 240 includes an interface unit 310, an authentication processing unit 320, a storage unit 330, a printing environment setting unit 340, an update check unit 350, an update performing unit 360, an e-mail printing unit 370, a bootstrap unit 380, and a responder unit 390.

Referring to FIGS. 2 and 3, based on protocols such as Hypertext Transfer Protocol (HTTP), or Simple Object Access Protocol (SOAP), the interface unit 310 connects to a service provider such as the e-mail profile server 220 and the user PC 210, and receives a desired user e-mail profile, thereby providing the printing environment setting unit 340. Also, the interface unit 310 connects to the service broker 230, and based on Web Service Definition Language (WSDL), receives location information on a location of a stored user profile. Also, the interface unit 310 receives an e-mail stored in the e-mail server 250 via POP3, thereby providing the e-mail printing unit 370.

The authentication processing unit 320 performs authentication to the e-mail profile server 220 or the user PC 210 which are connected via the interface unit 310, and checks whether the authentication is successful. Only when the authentication is successful, the authentication processing unit 320 allows the interface unit 310 to receive the user profile stored in the e-mail profile server 220 or the user PC 210. At this time, a method of performing the authentication by the authentication processing unit 320 is selected between a method of performing user authentication by directly receiving user information via a panel of the MFP 240, and a method of performing user authentication by connecting to the user PC 210 via the interface 310.

The storage unit 330 stores the user profile received by the interface unit 310. Such a stored user profile may be provided to the update check unit 350, thereby being used in checking whether the user profile has been updated, or provided to the printing environment setting unit 340, thereby being used in setting an e-mail printing environment corresponding to each user.

The printing environment setting unit 340 interprets the user profile received by the interface unit 310, and sets an e-mail printing environment corresponding to each user of the MFP 240. For example, the e-mail printing environment to be set includes information on private e-mail accounts of users, filtering information indicating which e-mail is allowed to be printed or prohibited from being printed, and information indicating which method is to be used in printing an e-mail. However, when the user profile received by the interface unit 310 does not exist, the printing environment setting unit 340 uses basic information stored in the MFP 240, and sets the e-mail printing environment.

The update check unit 350 checks whether updating the user profile stored in the storage unit 330 is necessary. For this purpose, the update check unit 350 may compare receipt date of the user profile stored in the storage unit 330 to registration date of the user profile registered in the service broker 230, and as a result of the comparison, when two dates are different with each other, the update check unit 350 may judge whether updating the user profile is necessary.

As a result of the check by the update check unit 350, if the update is necessary, the update performing unit 360 connects to the e-mail profile server 220 or the user PC 210 via the interface unit 310, receives a user profile, and overwrites the user profile stored in the storage unit 330 with the received user profile, thereby updating a user profile.

The e-mail printing unit 370 prints an e-mail received by the interface unit 310, according to the e-mail printing environment set corresponding to each user by the printing environment setting unit 340.

When power is initially supplied to the MFP 240, the bootstrap unit 380 informs the service broker 230 that the MFP 240 is an apparatus providing a web service e-mail print function, and makes the MFP 240 registered in the service broker 230.

When the responder unit 390 receives a request for scan of MFPs providing an e-mail printing function from the user PC 210, the responder unit 390 responds to the user PC 210 that the MFP 240 provides the e-mail printing function.

Figure 4:
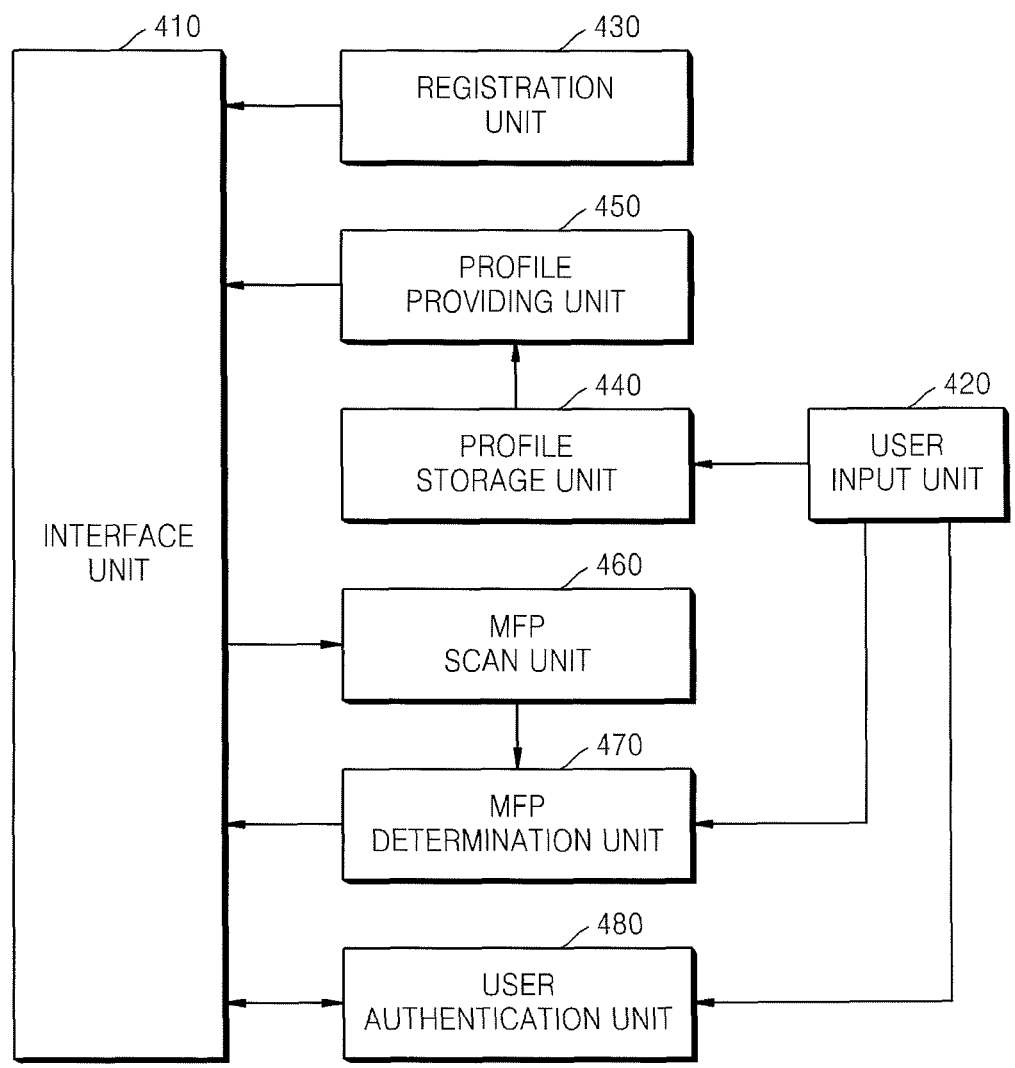
FIG. 4 is a block diagram illustrating a configuration of a user PC illustrated in FIG. 2.

FIG. 4 is a block diagram illustrating configuration of a user PC 210 illustrated in FIG. 2.

Referring to FIGS. 2 and 4, the user PC 210 includes an interface unit 410, a user input unit 420, a registration unit 430, a profile storage unit 440, a profile providing unit 450, a MFP scan unit 460, a MFP determination unit 470, and a user authentication unit 480.

Based on protocols such as HTTP or SOAP, the interface unit 410 connects to the e-mail profile server 220 and the MFP 240, and transmits a user profile stored in the profile storage unit 440. Also, the interface unit 410 connects to the service broker 230, and based on WSDL, provides URL information of the user PC 210, wherein the URL information is location information on a location of a stored user profile.

The user input unit 440 is input with a user profile from a user, and provides the e-mail profile server 220 with the input user profile via the profile storage unit 440 or the interface unit 410.

In the case where the user profile input via the user input unit 420 is stored in the profile storage unit 440, the registration unit 430 provides the service broker 230 with the URL information of the user PC 210 that is the location information on the location of the stored user profile, via the interface unit 410.

The profile storage unit 440 stores the user profile input via the user input unit 420. When the profile providing unit 450 receives a request for provision of the user profile from the MFP 240, the profile providing unit 450 provides the MFP 240 with the user profile stored in the profile storage unit 440 via the interface unit 410.

The MFP scan unit 460 scans MFPs providing an e-mail printing function. To be more specific, the MFP scan unit 460 attempts to connect to the service broker 230 via the interface unit 410, and as a result of the attempt, when the MFP scan unit 460 succeeds in establishing a connection, the MFP scan unit 460 scans the MFPs which provide the e-mail printing function and are stored in the service broker 230. However, when the MFP scan unit 460 fails in establishing the connection, the MFP scan unit 460 scans MFPs providing an e-mail printing function, wherein the MFPs are from among MFPs which are connected via a network.

From among the MFPs scanned by the MFP scan unit 460, the MFP determination unit 470 determines the MFP 240 input via the input unit 420 to be a MFP to which the user profile is to be applied so as to print an e-mail.

When the MFP 240 requires user authentication, in correspondence to this request, the user authentication unit 480 provides user authentication information. At this time, the user authentication information may be user authentication information input via the user input unit 420.

Figure 5:
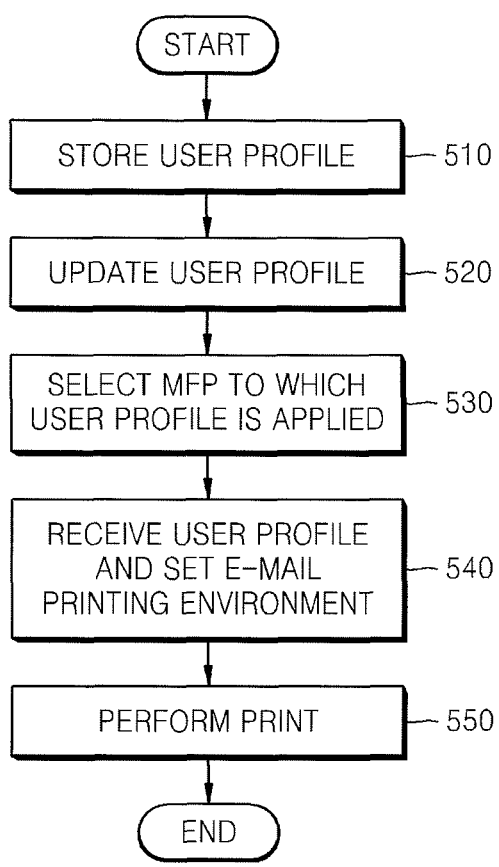
FIG. 5 is a flowchart illustrating a method of printing an e-mail by using a web service, according to an embodiment of the present general inventive concept.

FIG. 5 is a flowchart illustrating a method of printing an e-mail by using a web service, according to an embodiment of the present general inventive concept.

A MFP 240, used in the method with reference to FIG. 5, is an example of an apparatus supporting an e-mail printing function, and image forming apparatuses performing one or more functions from among a print function, a copy function, a scan function, and a fax message exchange function may substitute for the MFP 240. Also, a user PC 210 includes desktop and laptop computers, and a storage medium capable of connecting to a network may substitute for the user PC 210.

Referring to FIGS. 2 and 5, in operation 510, a user profile input to the user PC 210 is stored in an e-mail profile server 220 or the user PC 210, and location information on a location of the stored user profile is registered in a service broker 230. The location information on the location of the stored user profile indicates one of URLs of the e-mail profile server 220 and the user PC 210. Particularly, in order to store the user profile in the e-mail profile server 220, the user PC 210 provides the e-mail profile server 220 with a user profile generated by a user, and the e-mail profile server 220 stores the provided user profile.

In operation 520, the MFP 240 connects to the e-mail profile server 220 and updates a user profile stored in the MFP 240. To be more specific, when power is supplied to the MFP 240, the MFP 240 connects to the service broker 230 and registers the MFP 240. Then, the MFP 240 obtains location information on currently registered user profiles from the service broker 230. The MFP 240 connects to the e-mail profile server 220 by using the obtained location information, and according to the user profile stored in the e-mail profile server 220, updates the user profile stored in the MFP 240.

In operation 530, the user PC 210 scans MFPs supporting an e-mail printing function, and selects a MFP 240 to be used from among the scanned MFPs. To be more specific, the user PC 210 connects to the service broker 230, scans registered MFPs, selects the MFP 240 to be used in printing an e-mail from among the scanned MFPs, and requests setting of a private e-mail account in the selected MFP 240.

In operation 540, the MFP 240 selected in operation 530 receives the user profile stored in the e-mail profile server 220, and according to the received user profile, sets an e-mail printing environment.

In operation 550, the MFP 240 prints an e-mail according to the e-mail printing environment set in operation 540.

Figure 6:
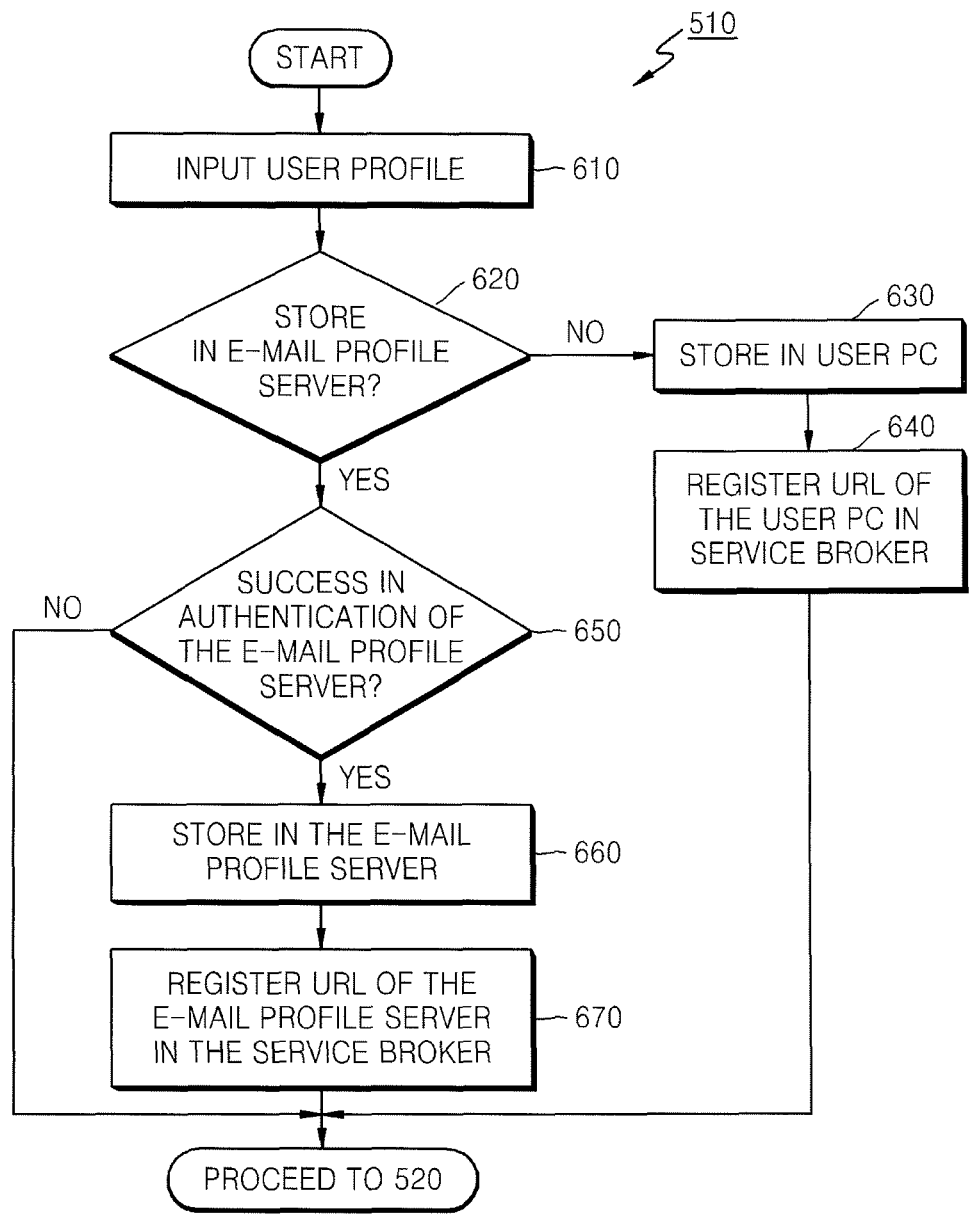
FIG. 6 is a flowchart illustrating in detail operation 510 illustrated in FIG. 5.

FIG. 6 is a flowchart illustrating in detail operation 510 illustrated in FIG. 5.

Referring to FIGS. 2 and 6, in operation 610, the user PC 210 is input a user profile in the form of XML from a user. The user profile includes an address of an e-mail server to be used, and basic information such as identification (ID) and password of an e-mail account to be used in the e-mail server. Also, the user profile may include information related to usage of an e-mail filtering function, wherein the information is information on a text string, e-mail accounts, or servers which should not be printed or which are allowed to be printed. Through the e-mail filtering function, setting spam mails or the like not to be printed, or to set only a desired e-mail to be printed by users is possible.

In operation 620, the user PC 210 is input by a user whether or not to store the input user profile in the e-mail profile server 220.

If the user PC 210 is input in operation 620 that the user profile is not stored in the e-mail profile server 220, the user PC 210 stores the user profile input in operation 610 in the user PC 210 in operation 630.

When the user PC 210 stores the user profile in operation 630, the user PC 210 connects to the service broker 230 and registers location information of the user profile in the service broker 230 in operation 640. At this time, the location information of the user profile may be URL of the user PC 210.

If the user PC 210 is input in operation 620 that the user profile is stored in the e-mail profile server 220, the user PC 210 attempts to authenticate the e-mail profile server 220, and as a result of the attempt, determines whether the authentication is successful in operation 650.

When the authentication is successful in operation 650, in operation 660, the user PC 210 provides the e-mail profile server 220 with the user profile input in operation 610.

In operation 670, the e-mail profile server 220 stores the user profile provided in operation 660, connects to the service broker 230, and registers location information of the user profile in the service broker 230. At this time, the location information of the user profile may be URL of the e-mail profile server 220.

Figure 7:
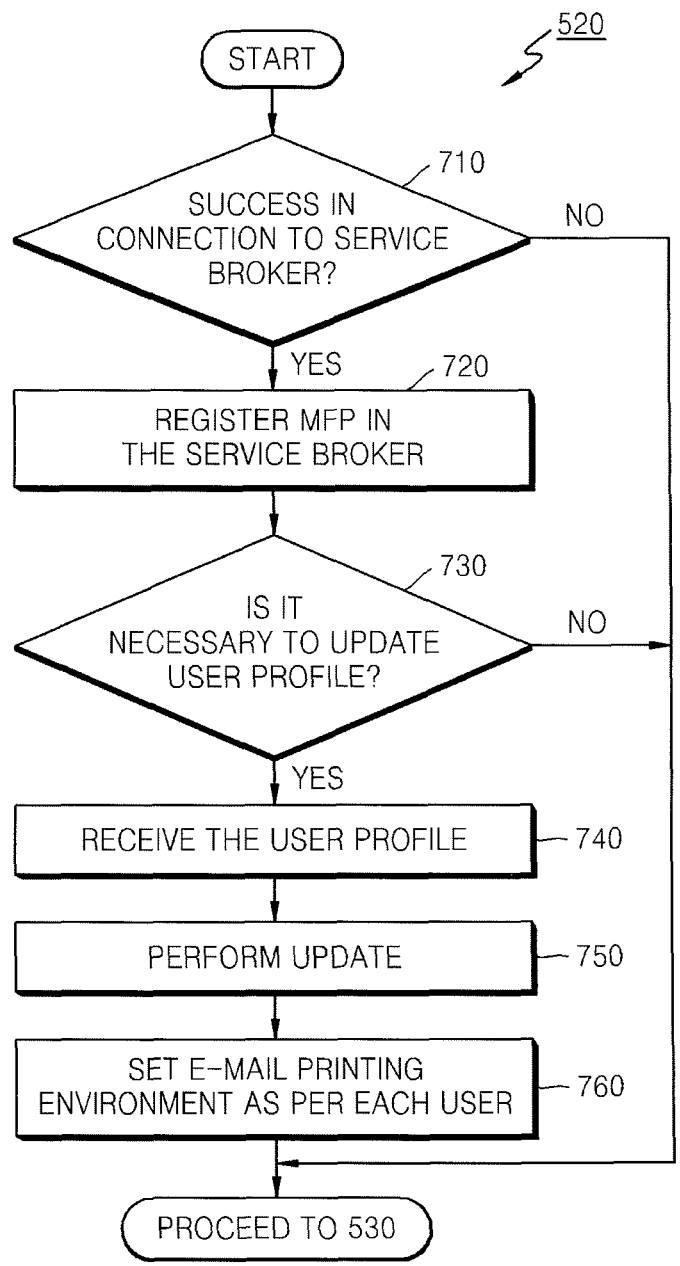
FIG. 7 is a flowchart illustrating in detail operation 520 illustrated in FIG. 5.

FIG. 7 is a flowchart illustrating in detail operation 520 illustrated in FIG. 5.

Referring to FIGS. 2 and 7, when power is supplied to the MFP 240 in operation 710, the MFP 240 attempts to connect to the service broker 230 and determines whether the connection is successful.

In operation 720, as a result of the determination in operation 710, when the connection to the service broker 230 is successful, the MFP 240 informs the service broker 230 that the MFP 240 provides a web service e-mail print function, and registers the MFP 240.

In operation 730, when there is a user profile stored within the MFP 240, the MFP 240 checks whether the user profile is necessary for being updated. For this purpose, the MFP 240 may check the necessity of the update by comparing date of the user profile stored within the MFP 240 to date of the user profile registered in the service broker 230.

As a result of the check in operation 730, when the update is necessary, the MFP 240 connects to the e-mail profile server 220 or the user PC 210 in which the user profile is stored, and receives the user profile in operation 740.

In operation 750, the MFP 240 updates the user profile stored within the MFP 240 by using the user profile received in operation 740. If a user profile is not stored within the MFP 240, the user file may be updated by storing the user profile received in operation 740 in the MFP 240.

In operation 760, the MFP 240 sets printing environment corresponding to each user by using the user profile updated in operation 750.

Figure 8:
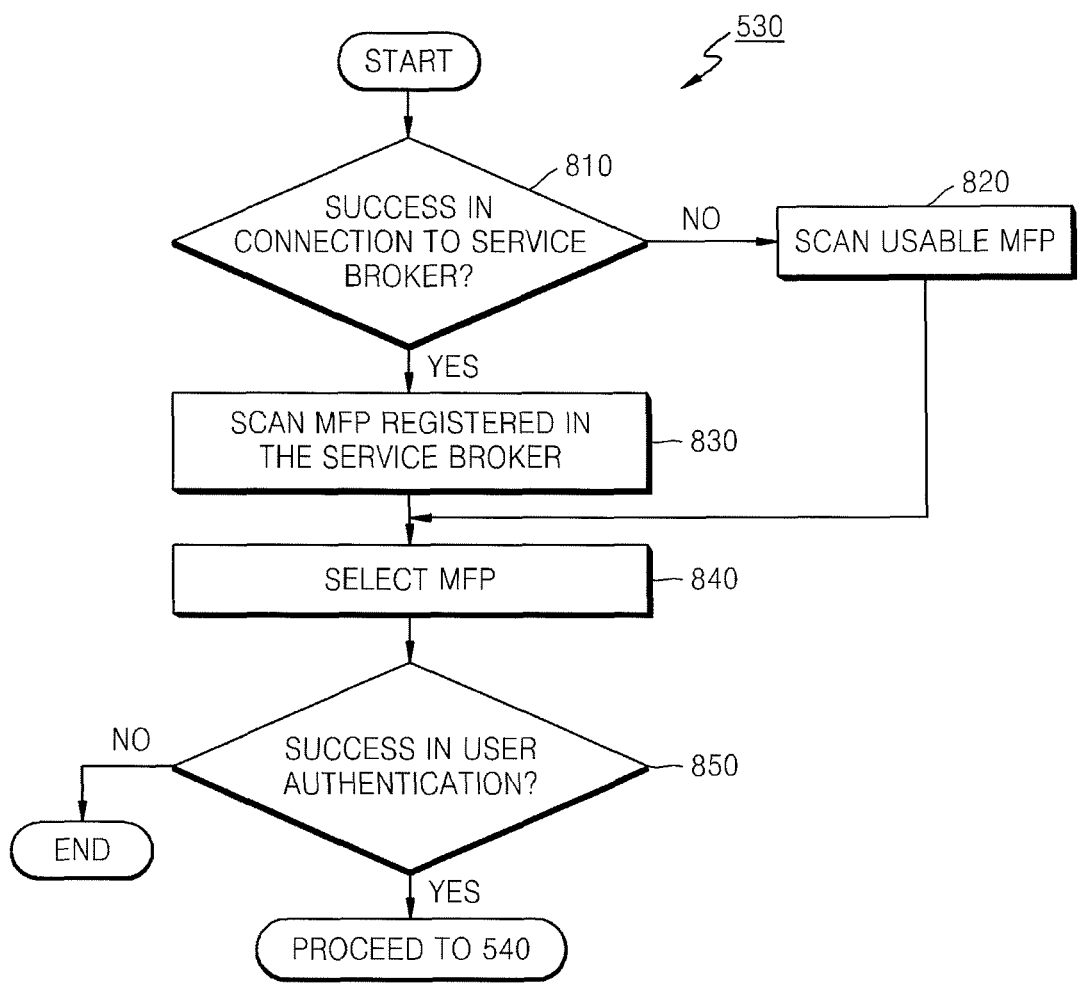
FIG. 8 is a flowchart illustrating in detail operation 530 illustrated in FIG. 5.

FIG. 8 is a flowchart illustrating in detail operation 530 illustrated in FIG. 5.

Referring to FIGS. 2 and 8, in operation 810, the user PC 210 attempts to connect to the service broker 220, and determines whether the connection is successful.

As a result of the determination in operation 810, if the connection to the service broker 230 fails, the user PC 210 scans usable MFPs via a network of the user PC 210 in operation 820.

As a result of the determination in operation 810, if the connection to the service broker 230 is successful, the user PC 210 scans MFPs which provide an e-mail print function and are registered in the service broker 230 in operation 830.

In operation 840, the user PC 210 determines a MFP 240 from among the MFPs scanned in operations 820 and 830, wherein the MFP 240 is to use the user profile.

In operation 850, the user PC 210 performs user authentication on the MFP 240 determined in operation 840. At this time, a method of performing communication between the user PC 210 and the MFP 240, and thereby performing the user authentication may be used as a method of performing user authentication. Another method of receiving authentication information from a user via a panel of the MFP 240 may be used. The reason of performing the user authentication is to allow only users having access rights to the MFP 240 to use the MFP 240. Such user authentication may be omitted as necessary.

Figure 9:
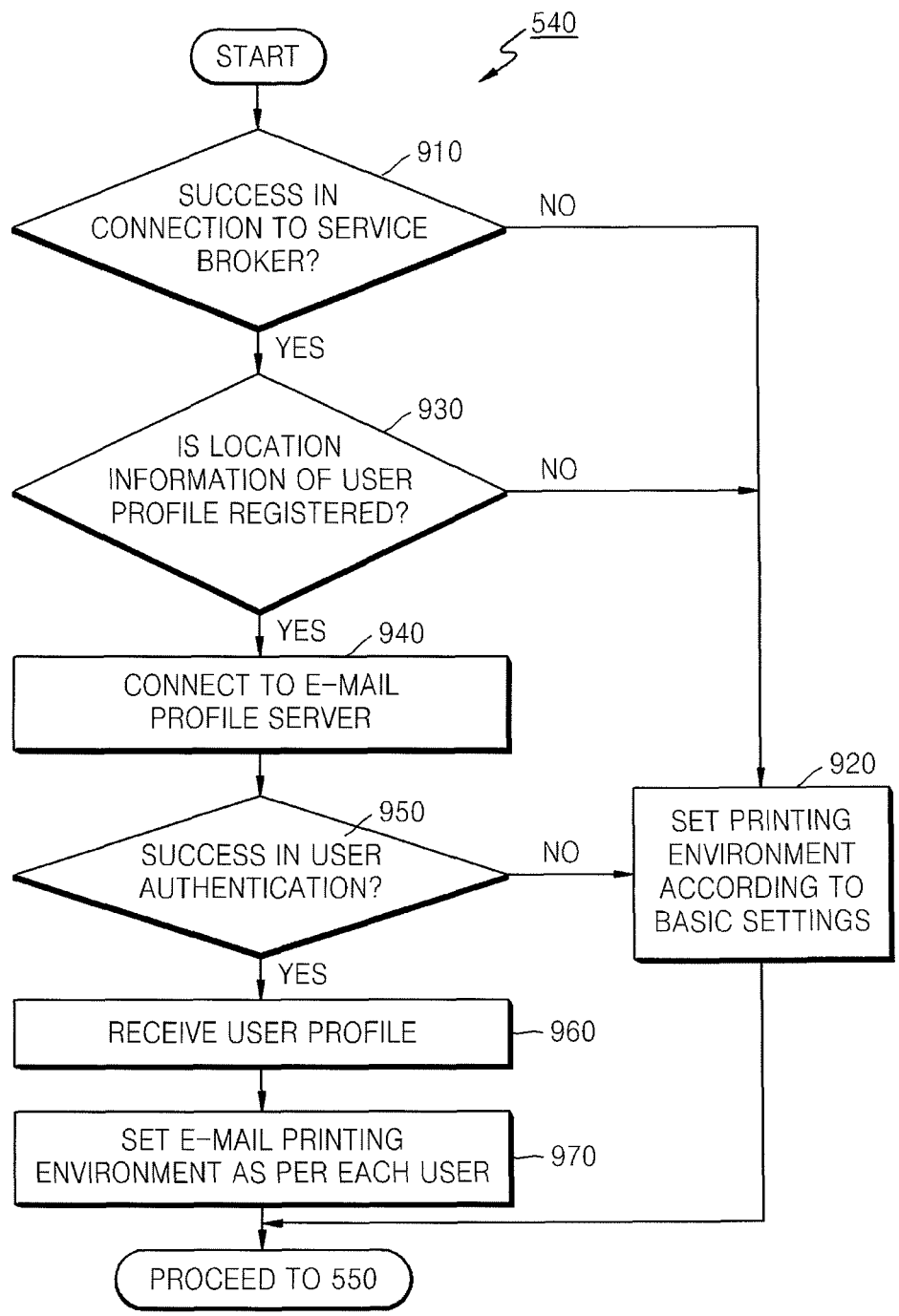
FIG. 9 is a flowchart illustrating in detail operation 540 illustrated in FIG. 5.

FIG. 9 is a flowchart illustrating in detail operation 540 illustrated in FIG. 5.

Referring to FIGS. 2 and 9, in operation 910, the MFP 240 attempts to connect to the service broker 230, and as a result of the attempt, checks whether the connection is successful.

As a result of the check in operation 910, if the connection to the service broker 230 fails, the MFP 240 sets an e-mail printing environment of the MFP 240 according to basic settings stored in an internal memory device of the MFP 240 in operation 920.

As a result of the check in operation 910, if the connection to the service broker 230 is successful, the MFP 240 checks whether location information of the user profile is registered in the service broker 230 in operation 930. As a result of the check, when the location information of the user profile is not registered, the MFP 240 proceeds to operation 920 and sets an e-mail printing environment of the MFP 240 according to basic settings stored in an internal memory device of the MFP 240.

As a result of the check in operation 930, when the location information of the user profile is registered, the MFP 240 connects to the e-mail profile server 220 or the user PC 210 which correspond to the location information in operation 940.

In operation 950, the MFP 240 performs authentication on the e-mail profile server 220 or the user PC 210 which are connected in operation 940, checks whether the authentication is successful, and as a result of the check, when the authentication fails, the MFP 240 proceeds to operation 920.

As a result of the check in operation 950, when the authentication is successful, the MFP 240 receives a user profile stored in the e-mail profile server 220 or the user PC 210 in operation 960.

In operation 970, the MFP 240 interprets the user profile received in operation 960, and sets an e-mail printing environment corresponding to each user of the MFP 240. For example, such e-mail printing environment corresponding to each user is about information on private e-mail accounts of users, e-mail filtering related to which e-mail is allowed or filtered, a method of printing an e-mail, and the like.

Figure 10:
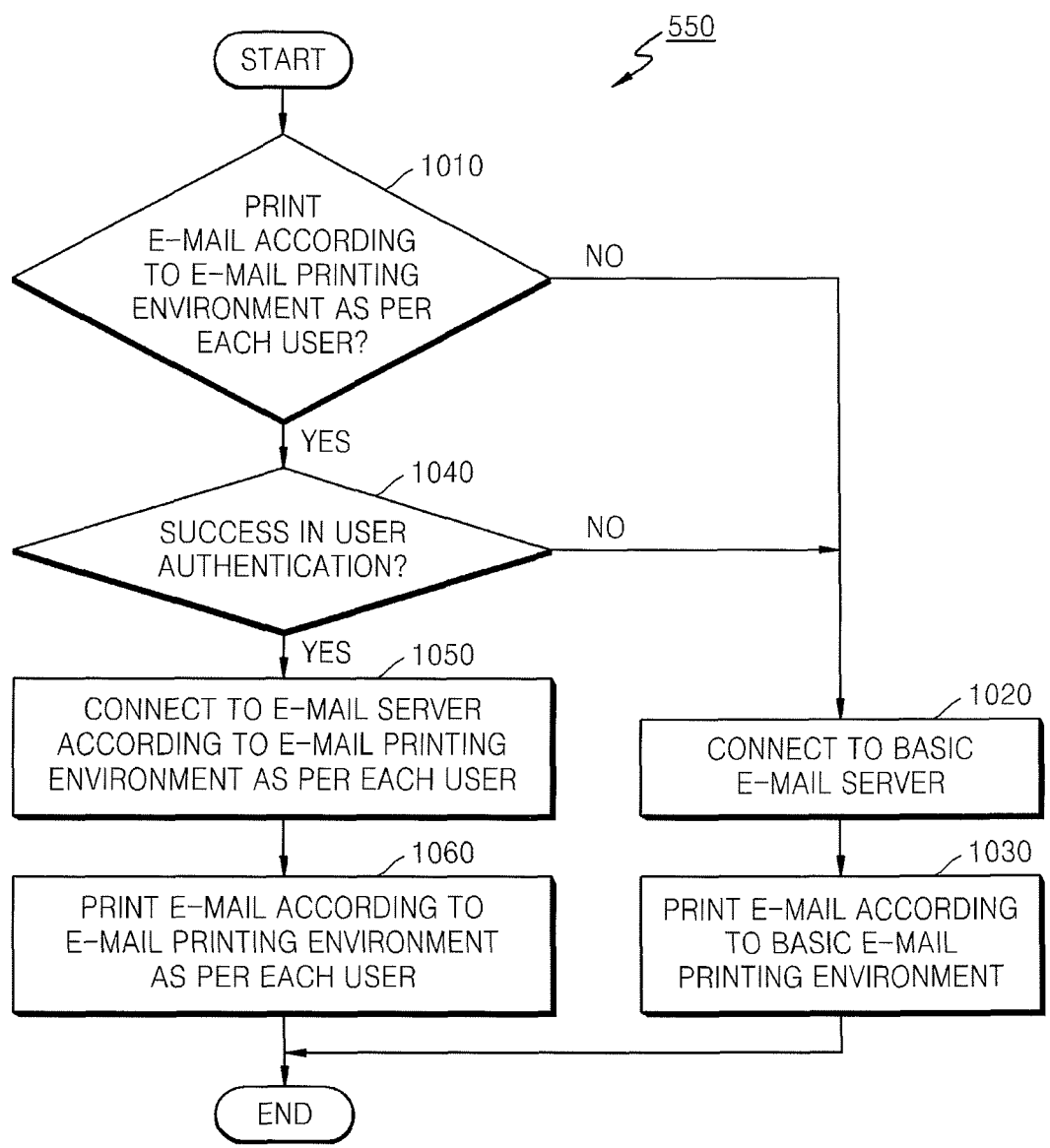
FIG. 10 is a flowchart illustrating in detail operation 550 illustrated in FIG. 5.

FIG. 10 is a flowchart illustrating in detail operation 550 illustrated in FIG. 5.

Referring to FIG. 10, in operation 1010, the MFP 240 is input whether to print an e-mail according to e-mail printing environment set corresponding to each user or basic printing environment of the MFP 240.

When the MFP 240 is input so as to print an e-mail according to the basic printing environment of the MFP 240 in operation 1010, the MFP 240 connects to an e-mail server basically set in the MFP 240 in operation 1020.

In operation 1030, the MFP 240 receives an e-mail stored in the connected e-mail server, and prints the received e-mail according to the basic printing environment.

When the MFP 240 is input so as to print an e-mail according to the e-mail printing environment set corresponding to each user in operation 1010, the MFP 240 performs user authentication, and when the user authentication fails, the MFP 240 proceeds to operation 1020 in operation 1040. At this time, a method of performing the user authentication is one of a method of directly being input user information via a Liquid Crystal Display (LCD) panel of the MFP 240 and thereby performing the user authentication, and a method of connecting to the user PC 210 by the MFP 240 and thereby performing the user authentication. Such user authentication operation may be omitted as necessary.

When the user authentication is successful in operation 1040, the MFP 240 connects to the e-mail server 250 according to the e-mail printing environment set corresponding to each user in operation 1050.

In operation 1060, the MFP 240 receives an e-mail stored in the e-mail server 250 connected in operation 1050, and prints the received e-mail according to the e-mail printing environment set corresponding to each user.

As described above, a method of printing an e-mail according to the printing environment corresponding to each user according to the present general inventive concept enables the e-mail printing environment to be set by using the web service, whereby users can conveniently set a desired e-mail printing environment in an image forming apparatus such as a MFP or a printer which provide the web service, and print an e-mail.

Also, once the printing environment corresponding to each user is set, the set printing environment can be identically set in all image forming apparatuses supporting the present general inventive concept, without causing users to perform additional operations.

Since the method of printing the e-mail according to the printing environment corresponding to each user according to various embodiments of the present general inventive concept provides e-mail printing environment differential corresponding to each user, users can print only desired e-mails, thereby greatly decreasing resource depletion.

The general inventive concept can also be embodied as computer-readable codes on a computer readable recording medium. The computer-readable medium can include a computer-readable recording medium and a computer-readable transmission medium. The computer-readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer-readable recording medium can also be distributed over network coupled computer systems so that the computer readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of printing an e-mail according to printing environment settings of a printing apparatus corresponding to each user, the method comprising:
   requesting, in the printing apparatus, a service broker for location information on an external device at which a user profile is stored;
   receiving, in the printing apparatus, the location information from the service broker in the printing apparatus;
   connecting, in the printing apparatus, the external device in correspondence to the received location information;
   receiving, in the printing apparatus, the user profile stored in the connected external device;
   setting, in the printing apparatus, an e-mail printing environment of the printing apparatus by using the received user profile; and
   printing a printing-allowed e-mail received from an e-mail server by the printing apparatus according to the set e-mail printing environment.

2. The method of claim 1, wherein the external device comprises:
   one of a server and a user PC (Personal Computer) storing an e-mail profile of a user.

3. The method of claim 1,
   wherein the user profile is provided from the external device, and
   wherein the location information of the user profile is registered in the service broker.

4. The method of claim 1, wherein the receiving of the user profile comprises:
   performing user authentication with the connected external device; and
   receiving the user profile stored in the connected external device, according to the performed user authentication result.

5. The method of claim 1, further comprising:
   wherein the service broker provides a user to scan printing apparatuses registered in a service broker and determines one or more printing apparatuses which are to print an e-mail, wherein the one or more printing apparatuses are from among the scanned printing apparatuses, and the determined one or more printing apparatuses receive the user profile stored in the external device.

6. The method of claim 1, further comprising:
   connecting the printing apparatus to the service broker upon application of power to the printing apparatus; and
   updating the user profile stored in the printing apparatus based on the user profile stored externally, wherein the external device at which the user profile stored externally is stored is provided by the service broker.

7. The method of claim 1, wherein:
   the user profile comprises filtering information used to select an e-mail to be printed from among e-mails stored in the e-mail server; and the setting of the e-mail printing environment comprises setting the e-mail printing environment whereby an e-mail satisfying the filtering information in the received user profile is printed.

8. The method of claim 1, further comprising:
setting an e-mail printing environment so that an e-mail is printed by using basic information, when the reception of the user profile stored externally fails.

9. The method of claim 1, wherein:
the user profile comprises an address of the e-mail server storing the e-mail to be printed; and
the setting of the e-mail printing environment comprises setting the e-mail printing environment so that the e-mail stored in the e-mail server is printed by using an address of the e-mail server in the received user profile.

10. An apparatus to print an e-mail according to printing environment settings of a printing apparatus corresponding to each user, the apparatus comprising:
an interface unit to request a service broker for location information on an external device at which a user profile is stored, receive the location information from the service broker, connect the external device in correspondence to the received location information, and receive a user profile stored in the connected external device;
a printing environment setting unit to set an e-mail printing environment of the printing apparatus by using the received user profile; and
an e-mail printing unit that prints a printing-allowed e-mail received from an e-mail server according to the set e-mail printing environment.

11. The apparatus of claim 10, wherein the external device comprises:
one of a server and a user PC storing an e-mail profile of a user.

12. The apparatus of claim 10, further comprising:
a storage unit to store the received user profile.

13. The apparatus of claim 10, further comprising:
an authentication processing unit to perform user authentication with the connected external device, and according to the performed user authentication result, enabling the interface unit to receive the user profile stored in the connected external device.

14. The apparatus of claim 10, further comprising:
an update check unit to determine whether a user profile stored in the apparatus should be updated by comparing the user profile stored in the apparatus with the user profile externally stored; and
an update performing unit to replace the user profile stored in the apparatus with the user profile externally stored if the update check unit determines the user profile stored in the apparatus is necessary, wherein the update check unit performs a determination if an update is necessary upon the application of power to the apparatus.

15. The apparatus of claim 10, wherein, when the interface unit fails to receive the user profile stored in the external device, the printing environment setting unit sets an e-mail printing environment so that an e-mail is printed by using basic information.

16. A non-transitory computer-readable recording medium having recorded thereon a program to execute a method, the method comprises:
requesting, in the printing apparatus, a service broker for location information on an external device at which a user profile is stored;
receiving, in the printing apparatus, the location information from the service broker;
connecting, in the printing apparatus, the external device in correspondence to the received location information;
receiving, in the printing apparatus, a user profile stored in the connected external device;
setting, in the printing apparatus, an e-mail printing environment of a printing apparatus by using the received user profile; and
printing a printing-allowed e-mail received from an e-mail server by the printing apparatus according to the set e-mail printing environment.

17. An e-mail printing apparatus, comprising:
an interface unit to request a service broker for location information on an external device at which a user profile is stored, receive the location information from the service broker, connect the external device in correspondence to the received location information, and receive a user profile stored in the connected external device;
a printing environment setting unit to set a respective user desired printing environment of the e-mail printing apparatus corresponding to the user profile by using a web service; and
an e-mail printing unit to print a printing-allowed e-mail based on the set user desired printing environment of the e-mail printing apparatus.

18. The apparatus of claim 17, wherein the user desired printing environment comprises:
one or more of information on a private e-mail account of the user, filtering information indicating which e-mail is allowed to be printed or prohibited from being printed, and information indicating which method is to be used in printing an e-mail.

19. The apparatus of claim 17, wherein the user desired printing environment corresponds to the user profile.

20. An e-mail printing system, comprising:
a service broker to register location information of a user profile corresponding to a user; and
a multifunctional printer (MFP) to check whether the location information of the user profile is registered with the service broker, to connect to one of an e-mail profile server and a user PC corresponding to the location information based on the registered location information of the user profile, to perform authentication on the one of the e-mail profile server and the user PC, to receive the user profile stored in the one of the e-mail profile server and the user PC, to interpret the user profile, and to set an e-mail printing environment of the multifunctional printer corresponding to the user profile.

* * * * *